F. H. ROYCE.
JOINT FOR ARTICULATED CONNECTING RODS AND THE LIKE.
APPLICATION FILED FEB. 12, 1919.

1,369,547.

Patented Feb. 22, 1921.

Inventor:
Frederick Henry Royce.
by his Attorney,

F. H. ROYCE.
JOINT FOR ARTICULATED CONNECTING RODS AND THE LIKE.
APPLICATION FILED FEB. 12, 1919.

1,369,547.

Patented Feb. 22, 1921.
2 SHEETS—SHEET 2.

Inventor:
Frederick Henry Royce.
by his Attorney,

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

JOINT FOR ARTICULATED CONNECTING-RODS AND THE LIKE.

1,369,547.     Specification of Letters Patent.     Patented Feb. 22, 1921.

Application filed February 12, 1919. Serial No. 276,589.

*To all whom it may concern:*

Be it known that I, FREDERICK HENRY ROYCE, of Nightingale Road, Osmaston Road, Derby, in the county of Derby, England, a subject of the King of England, have invented certain new and useful Improvements in Joints for Articulated Connecting-Rods and the like, of which the following is a specification.

This invention relates to hinged joints for articulated connecting rods and the like of that type wherein the end of one rod or member to be jointed is introduced between jaws formed on the other rod or member, the two said rods or members being held in position by a pin passed through holes in the said end and jaws, about which pin one member can rotate within prescribed limits, such a joint being particularly suitable for use with the connecting rods of internal combustion engines.

In such joints it is necessary for the pins to be accurately placed and maintained in position, and for them to be secured by and tightly held in the jaws, but many devices previously used have proved faulty largely as a result of distortion of the pin, consequent upon the necessity of placing a permanent axial load upon it in order to secure it tightly in position. Where a hollow pin formed with a taper at one or both ends has been used, trouble has been experienced as the result of the tendency of said pin to collapse when forced in a hole or holes tapered for its reception.

An object of the present invention is to avoid any permanent deformation of the connecting pin, while at the same time securing the pin tightly in position, and a further object is to avoid the possibility of axial distortion or squeezing in of the jaws carrying said pin when the latter is being secured in position.

The said objects are attained by the novel construction of joint hereinafter fully described and the essential features of which are pointed out in the appended claim, reference being made to the accompanying drawings wherein there is shown by way of example the application of the invention to the articulated connecting rod of a V type internal combustion engine.

In said drawings: Figure 1 is a cross-section through the pin, jaw and end of the articulated connecting rod during assemblage of the parts.

$a$ and $a'$ designate the members of an articulated rod to be joined, and $b$, $b^1$ the jaws carried by the member $a$, the other member $a^1$ being provided with a link or eye $c$ to be introduced and held between said jaws $b$ and $b^1$. The connecting pin $d$ is made hollow, either throughout its length as shown, or at its ends only, and serves to hold the link or eye $c$ in position between the jaws $b$ and $b^1$, a bush $c^1$ being inserted within the link $c$ between the latter and the pin and constituting a bearing for said pin. The said pin $d$ is formed on its exterior with its ends or parts $d^1$ which are held by the jaws slightly tapered in one direction, the jaws having correspondingly tapered holes $d^2$ to receive said ends, but the exterior part of said pin between the jaws being, however, parallel with its axis, while on the inside the ends of the pin are so tapered as at $d^3$ that the internal diameter of the tapered parts is larger at the ends or orifices of the hollow of the pin and diminishes from the ends toward the center. The dimensions of the pin and the holes in the jaws are respectively such that when the pin is forced home into its seat, it is reduced in diameter at its ends by a carefully predetermined amount.

Plugs $f$ $f^1$ are inserted into the hollow or hollowed ends of the pin $d$, said plugs being tapered to correspond with the internally tapered ends or seatings of the pin, one of said plugs $f$ being provided with a head $f^2$. Both plugs (together also with the pin itself if the latter is not made hollow throughout) have a central hole $f^3$ which in the plug $f^1$ is threaded as at $f^4$ to receive a threaded bolt $g$.

The plug $f^1$ and bolt $g$ are also provided each with a transverse hole to receive a split pin $h$. The plugs are so proportioned that when forced home to their seatings in the pin, they cause the expansion of the ends of the pin approximately to their original diameter, and thereby further and finally tighten the pin in its seatings.

Oil passages $k$ are provided in the rod members $a\ a^1$, in the jaw $b^1$, in the link $c$ and in the pin $d$ to provide for proper lubrication of contacting surfaces in connection with these parts.

Figure 1:
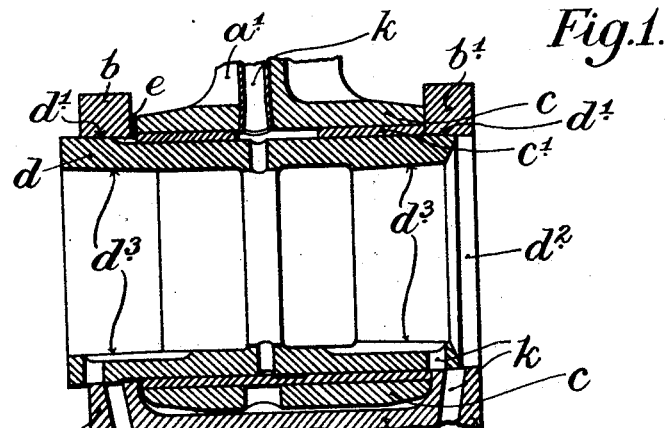
Figure 2:
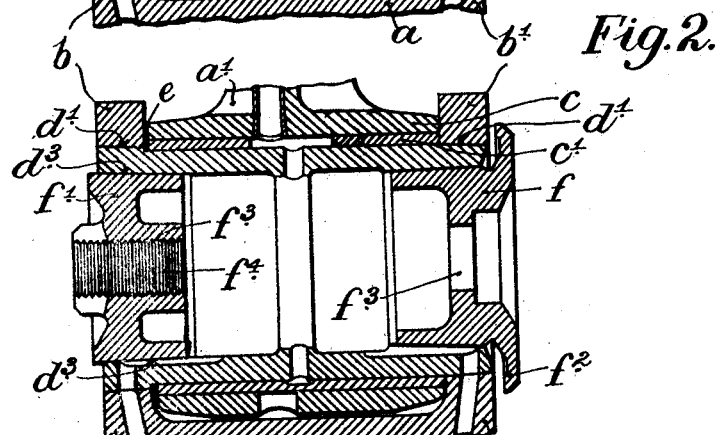
Fig. 2 is a similar section at a later stage of the assemblage.
Figure 3:
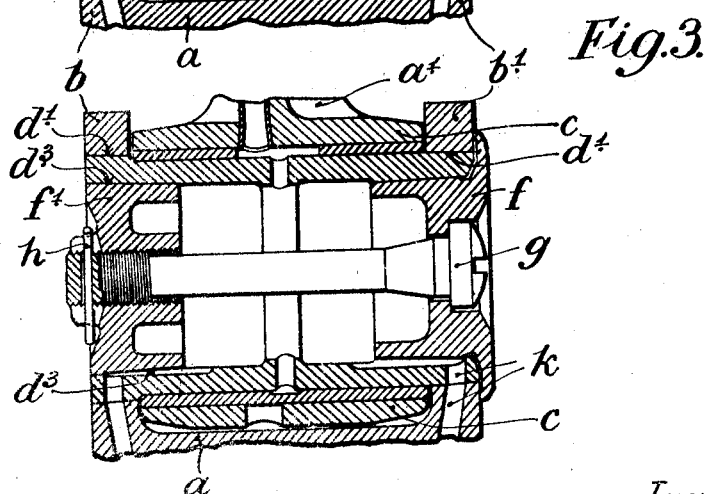
Fig. 3 is a similar section of the completed joint.
Figure 4:
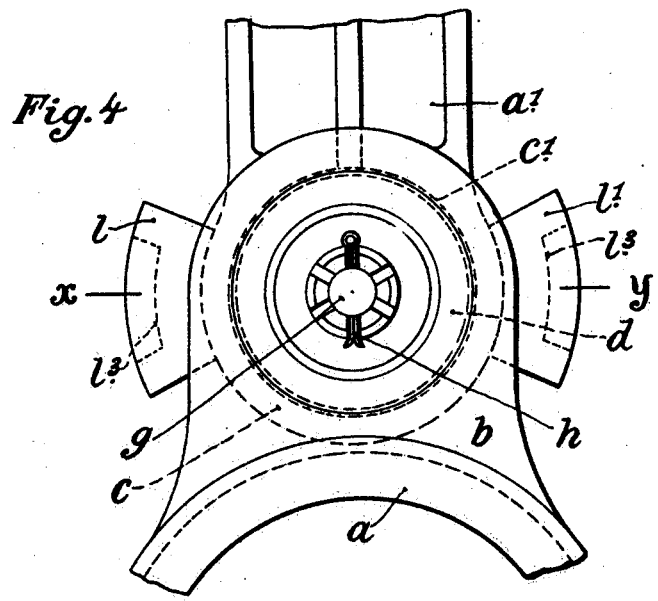
Fig. 4 is an end view of the joint with certain metal supports for the jaws in position.
Figure 5:
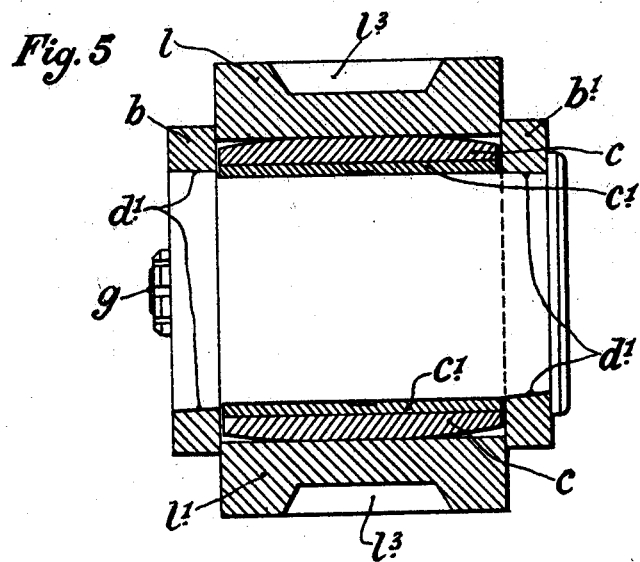
Fig. 5 is a section on the line $x$—$y$ of Fig. 4.

To prevent the jaws from collapsing or being distorted when subjected to the pressure involved in introducing the pin $d$ or the plugs $f$, $f^1$ there are provided liners or flat strips of metal $e$ adapted to be temporarily placed between one end of the eye $c$ and the adjacent jaw $b$ (Figs. 1 and 2), or in place of said liners there may be provided supports in the form of strong metal bars $l\ l^1$ placed end on between the jaws.

The joint is assembled as follows:—when the members $a$ and $a^1$ are in position, the pin $d$ is inserted and (the liners $e$ being in position) forced home by hydraulic or other pressure, the action of this pressure slightly collapsing the ends of said pin $d$. The plugs $f$, $f^1$ are then inserted in the ends of the pin and forced home by pressure which tends to force outward the ends of the pin, thus restoring it to approximately its original diameter and causing a permanently tight joint independent of permanent axial load either of compression or tension on the pin.

What I claim as my invention and desire to secure by Letters Patent of the United States is:—

In a hinged joint for articulated connecting rods, the combination of two rod members, one of which is provided with perforated jaws, and the other of which is furnished with a link or eye introduced between said jaws, the perforations of the jaws being tapered in the same direction, a hollowed pin inserted under pressure into said jaws and eye, said pin having its ends exteriorly tapered in the same direction to correspond with the taper of the jaw perforations and interiorly tapered so that the internal diameter diminishes inwardly from said ends whereby the pin ends will be slightly reduced in diameter when the pin is forced into place, and plugs inserted under pressure into the ends of the pin and exteriorly tapered to correspond to the interior taper of the pin ends so as to expand said pin ends approximately to their original diameter.

In witness whereof I have signed this specification in the presence of two witnesses.

FREDERICK HENRY ROYCE.

Witnesses:
H. R. CUTTEN,
F. PARSONS.